(12) United States Patent
Heymer

(10) Patent No.: US 11,421,980 B2
(45) Date of Patent: Aug. 23, 2022

(54) METHOD FOR DETERMINING A POSITION AND ORIENTATION OF AN OBJECT USING A PROFILOMETER

(71) Applicant: FORD GLOBAL TECHNOLOGIES, LLC, Dearborn, MI (US)

(72) Inventor: Arne Heymer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 920 days.

(21) Appl. No.: 16/196,362

(22) Filed: Nov. 20, 2018

(65) Prior Publication Data
US 2019/0154429 A1   May 23, 2019

(30) Foreign Application Priority Data
Nov. 22, 2017   (DE) .................... 10 2017 220 876.7

(51) Int. Cl.
*G01B 11/10* (2006.01)
*G01B 11/00* (2006.01)
(Continued)

(52) U.S. Cl.
CPC .......... *G01B 11/005* (2013.01); *G01B 11/26* (2013.01); *G01S 17/06* (2013.01); *G01S 17/89* (2013.01); *G01C 15/006* (2013.01)

(58) Field of Classification Search
CPC ....... G01B 11/00; G01B 11/005; G01B 11/26; G01S 17/06; G01S 17/89; G01C 15/006
See application file for complete search history.

(56) References Cited

U.S. PATENT DOCUMENTS 2,991,007 A  * 7/1961  Perret-Gentil ............ F41G 5/08
                                                                   235/411
6,380,732 B1    4/2002  Gilboa
(Continued)

FOREIGN PATENT DOCUMENTS

CN   103150752 A  *  6/2013  ............ G06T 17/00
CN   103033189 B  *  5/2015  ............ G01C 21/24
(Continued)

OTHER PUBLICATIONS

Park, Won Shik et al. Measurement of fine 6-degree-of-freedom displacement of rigid bodies through splitting a laser beam: experimental investigation. SPIE Digital Library. Apr. 3, 2002. 2 pages.
(Continued)

*Primary Examiner* — Tung S Lau
(74) *Attorney, Agent, or Firm* — Frank Lollo; Brooks Kushman P.C.

(57) ABSTRACT

A method of determining position and orientation of an object using a profilometer. A measurement body has a predetermined polyhedral basic form and a defined spatial relationship with the object. The profilometer captures rectilinear coordinates of at least three measurement points lying on a profile line defined by a profilometer scan-line. Using the coordinates and measurement body geometric values, rotations of the measurement body are calculated about a measurement body z-axis, an intermediate y-axis resulting from the z-axis rotation, and about a profilometer-defined x-axis. Next, three translation displacements of the measurement body relative to the three profilometer-defined axes are calculated using the coordinates, the geometric values of the measurement body, and the above-calculated rotations. The position and an orientation of the object is determined by then applying the defined spatial relationship of the measurement body to the object.

5 Claims, 7 Drawing Sheets

(51) Int. Cl.
    *G01S 17/06*     (2006.01)
    *G01S 17/89*     (2020.01)
    *G01B 11/26*     (2006.01)
    *G01C 15/00*     (2006.01)

(56) References Cited

U.S. PATENT DOCUMENTS

| | | |
|---|---|---|
| 6,678,059 B2 | 1/2004 | Cho et al. |
| 7,312,862 B2 | 12/2007 | Zumbrunn et al. |
| 9,162,656 B2 | 10/2015 | Mattson et al. |
| 10,466,029 B2 * | 11/2019 | Fuchs ................. G01B 5/0016 |
| 2013/0012930 A1 | 1/2013 | Ruiz Morales et al. |
| 2016/0103222 A1 | 4/2016 | Böckem et al. |
| 2017/0146656 A1 | 5/2017 | Belsley et al. |

FOREIGN PATENT DOCUMENTS

| | | | |
|---|---|---|---|
| EP | 1764579 A1 * | 3/2007 | ........... G01B 21/042 |
| EP | 1901033 B1 | 3/2008 | |
| FR | 2906388 A1 * | 3/2008 | ............ B25J 9/1666 |
| FR | 2983420 A1 * | 6/2013 | ............. F01D 5/282 |
| WO | 2010150515 A1 | 12/2010 | |
| WO | 2016183618 A1 | 11/2016 | |

OTHER PUBLICATIONS

Examination report for German application No. DE 10 2017 220 876.7, filed Mar. 31, 2020, 4 pages.

* cited by examiner

Capturing, using a profilometer, rectilinear coordinates for each of at least three measurement points on a profilometer-detected profile line of a measurement body having a defined spatial relationship to the object.
12

Calculating, using the captured coordinates and known geometric values of the measurement body:
1) a z-axis rotation ($\Psi 2$) of the measurement body about a measurement body z-axis ($z_t$),
2) a y-axis rotation ($\Theta 1$) of the measurement body about an intermediate y-axis ($y_t^*$) resulting from the z-axis rotation, and
3) an x-axis rotation ($\Phi 0$) of the measurement body about a profilometer-defined x-axis ($x_s$).
14

Calculating, using a) the rectilinear coordinates, b) the known geometric values of the measurement body, and c) the above-calculated rotations ($\Psi 2$, $\Theta 1$, $\Phi 0$), a set of translation displacements of the measurement body relative to the profilometer-defined x-axis ($x_s$), y-axis ($y_s$), and z-axis ($z_s$).
16

Applying the defined spatial relationship of the measurement body to the object to find a position and an orientation of the object.
18

Fig. 9

METHOD FOR DETERMINING A POSITION AND ORIENTATION OF AN OBJECT USING A PROFILOMETER

CROSS-REFERENCE TO RELATED APPLICATIONS

This application claims foreign priority benefits under 35 U.S.C. § 119(a)-(d) to DE Application 10 2017 220 876.7 filed Nov. 22, 2017, which is hereby incorporated by reference in its entirety.

TECHNICAL FIELD

The invention relates to a method for the determination of position and orientation of an object using a non-contact profilometer. The invention further relates to an apparatus for the determination of position and orientation, and to a measurement body.

BACKGROUND

It can be necessary at test or inspection benches to capture a displacement of an object in the direction of each of three spatial axes as well as a rotation about each of three axes of rotation. The object can, for example, be a gearbox or a traction motor in relation to a motor vehicle or another object.

Displacements and rotations of this type can be captured by measuring the respective linear accelerations and rotation rates with subsequent integration in order to determine distances and angular values. The sensors required for this purpose are, however, sensitive to impacts and vibrations. These sensors are, furthermore, frequency-dependent, causing their output signals to scatter and be subject to offsets, so that a single or double integration leads to a signal drift. Slow movements in particular can thus only be captured to a limited extent.

Sampled measurements or contactless measurements require three sensors for the three spatial axes and three further sensors for angular measurement. Access from three sides, which is not always available, is also necessary.

Optical triangulation measurements with two cameras and subsequent evaluation require that three measuring bodies are used in order to be able to determine the displacement of an object in the direction of each of three spatial axes as well as a rotation about each of three axes of rotation. It is, however, necessary to arrange the two cameras with a minimum spacing from one another and from the object, which entails a high requirement for space which is not available in engine compartments or the underbody region of motor vehicles.

There is therefore a need for an improved method of measuring displacement of an object in the direction of all three spatial axes and of the rotation about all three axes of rotation.

SUMMARY

The object of the invention is achieved through a method for the determination of position and orientation, in which a measurement body with a predetermined polyhedral basic form is used which makes a profile line (defined when scanned by a profilometer) with at least three measurement points available, having the steps of:

capturing a data coordinate set, comprising at least two measured values (cartesian or rectilinear coordinates) for each of the respective measurement points, with a profilometer, wherein the measured values are representative of the profile line, evaluating the values of the coordinate set and known values of the geometry of the measurement body in order to determine a z-axis rotation of the measurement body about its z-axis, a y-axis rotation of the measurement body about the y-axis of a sensor head of the profilometer, and an x-axis rotation of the measurement body about the x-axis of the sensor head, and evaluating the values of the coordinate set, known values of the geometry of the measurement body and of the rotations found in order to determine the translation displacement of the measurement body in the direction of the x-axis, the y-axis and the z-axis of the sensor head.

A measurement body is thus used, which is assigned to the object to be monitored and which has a defined spatial relationship to the object. The measurement body may be a separate component which is detachably or permanently connected to the object, or the measurement body may be formed with or on the object, i.e. the object and the measurement body are formed integrally and/or of uniform material. The scan-plane of a profilometer projected onto the measurement body detects or makes available a profile line, wherein the path of the profile line through the measurement points is characterized such that a determination of a displacement of the object in the direction of all three spatial axes, as well as a rotation about all three axes of rotation, is possible. Each of the measurement points is described merely by two measurement values (a set of two-axis, planar, cartesian, or rectilinear coordinates), since all the measurement points lie in one and the same plane, that being the plane of the profilometer-detected profile line as defined and detected by the profilometer scan-plane. In other words, the profile line can be described by means of spacing-dependent height information proceeding from a start point, wherein, within certain limits, the measurement points together are assigned in each case to one possible position of the measurement body. Together with known values of the geometry of the measurement body, this permits a surprisingly simple determination of a displacement of the object in the direction of all three spatial axes and of a rotation about all three axes of rotation.

According to one embodiment, the measurement body has five planar surfaces, wherein two surfaces each have a triangular basic form, and three surfaces each have a trapezoidal basic form, wherein the respective measurement points are arranged at an intersection between one of the trapezoidal surfaces and an immediately adjacent trapezoidal surface. A line between two of the measurement points, a line through the further measurement point perpendicular to the connecting line of the measurement points mentioned first, and a known value are evaluated in order to determine the z-axis rotation. The two measurement values can be the first and last measurement points along the profile line. In other words, a further one of the at least three measurement points is arranged between the first and the last measurement points. The known value can be an angle of inclination of an intersection line of selected surfaces, e.g. the surfaces with trapezoidal basic form. The z-axis rotation about a vertical axis can thus be determined.

According to a further embodiment, a measurement body with a profilometer-detected profile line with at least four measurement points is used. This simplifies the evaluation of the measurement values.

According to a further embodiment, the measurement body has six planar surfaces, wherein five of the six surfaces have a trapezoidal basic form, and one of the six surfaces has a rectangular basic form, wherein the respective measurement points are arranged at an intersection between one of the surfaces and an immediately adjacent surface. In other words, the four measurement points are assigned to three surfaces on an upper edge of the measurement body. A displacement of the object in the direction of all three spatial axes, and a rotation about all three axes of rotation, can thus be determined by sampling only three surfaces. This reduces the time required for the sampling.

According to a further embodiment, two measurement points are arranged at an intersection between the surface with a rectangular basic form and a respective immediately adjacent surface with trapezoidal basic form. A displacement of the object in the direction of all three spatial axes, and a rotation about all three axes of rotation, can thus be determined in a manner that is particularly simple and thus economical with regard to computing resources.

According to a further embodiment, the measurement body is designed with axial symmetry. The measurement body can, for example, be designed with axial symmetry in reference to its x-axis or longitudinal axis. This simplifies a determination of a displacement of the object in the direction of all three spatial axes and of a rotation about all three axes of rotation, and thus leads to a method that is particularly economical with regard to computing resources.

According to a further embodiment, the measurement body has an essentially wedge-shaped design. An essentially wedge-shaped basic form here refers to two surfaces meeting at an acute angle, such as for example the surface with a rectangular basic form and the surface with, for example, a trapezoidal basic form, lying opposite to said surface. This too simplifies a determination of a displacement of the object in the direction of all three spatial axes and of a rotation about all three axes of rotation, and thus leads to a method that is particularly economical with regard to computing resources.

According to a further embodiment, in particular when using a measurement body with at least four measurement points, a first partial line and a second partial line of a line between two of the measurement points and a known value are evaluated in order to determine the z-axis rotation. The two measurement values can be the first and last measurement points along the profile line. In other words, a further two of the at least four measurement points are arranged between the first and last measurement points. The known value can be the angle between two lines which are congruent with boundary edges of two selected surfaces of the measurement body. The z-axis rotation about a vertical axis can thus be determined in a manner that is particularly simple and thus economical with regard to computing resources.

According to a further embodiment, a system of equations is solved numerically in order to determine the z-axis rotation. A numerical determination of roots can be carried out for this purpose.

According to a further embodiment, a y-axis rotation of the measurement body about its y-axis and an angular value, as well as a line length, are determined, and the z-axis rotation, the y-axis rotation and the angular value, as well as the line length, are evaluated in order to determine the y-axis rotation. The y-axis rotation about a transverse axis can thus be determined in a manner that is particularly simple and thus economical with regard to computing resources.

According to a further embodiment, two of the measurement values are evaluated in order to determine the x-axis rotation. The two measurement values can again be the first and last measurement points along the profile line. The x-axis rotation about a longitudinal axis can thus be determined in a manner that is particularly simple and thus economical with regard to computing resources.

A computer program product for carrying out such a method, an apparatus of this sort and a measurement body of this sort also relate to the invention.

The invention will now be explained with reference to a drawing, in which:

BRIEF DESCRIPTION OF THE DRAWINGS

FIG. 9 shows a flow chart of a method of determining a position and an orientation of an object.

DETAILED DESCRIPTION

Figure 1:
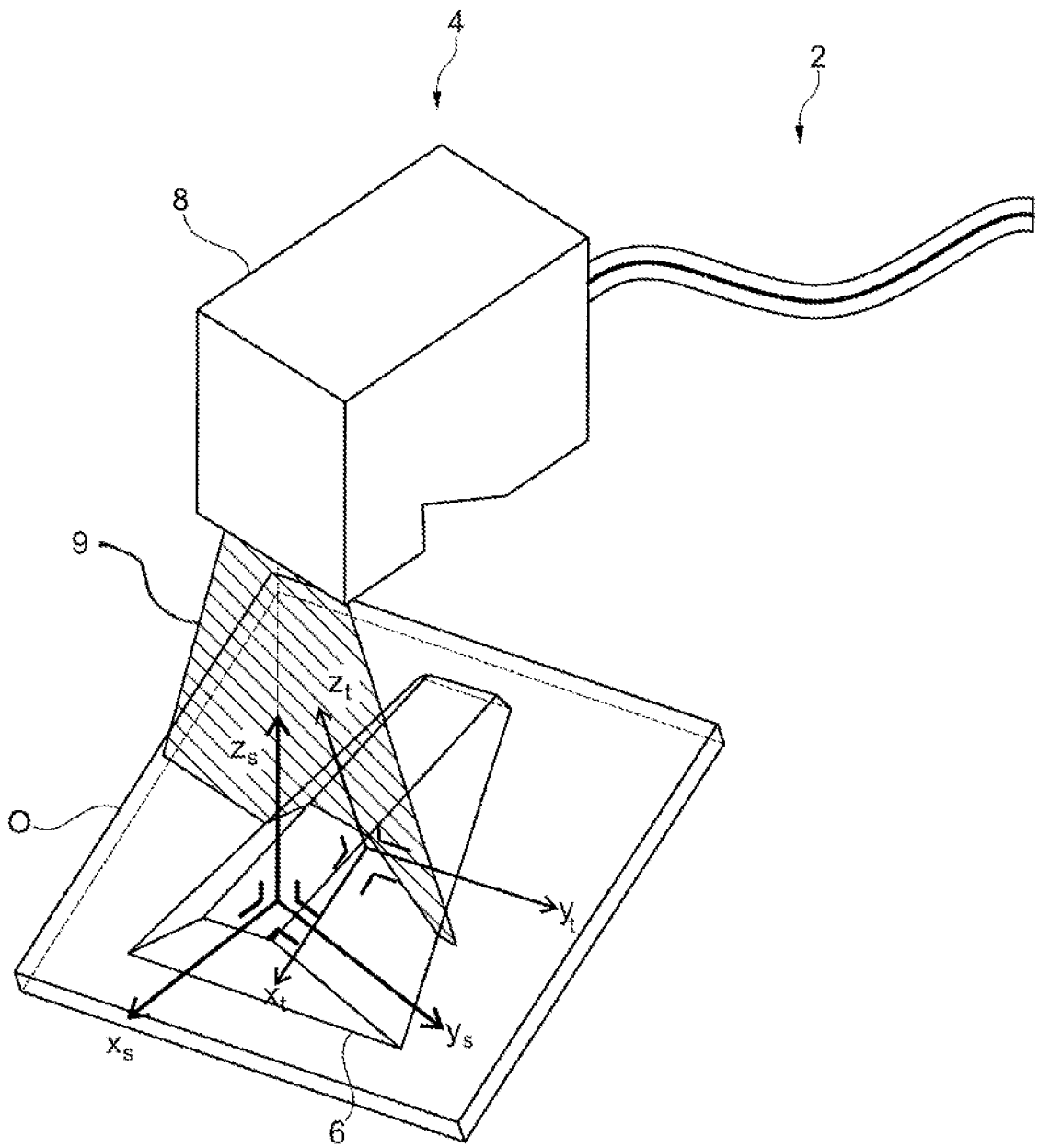
FIG. 1 shows a schematic illustration of an apparatus for the determination of position and orientation for carrying out an exemplary embodiment of a method according to the invention.

Reference is first made to FIG. 1.

An apparatus 2 for the determination of position and orientation of an object O is shown. The object O can be a part with a plane surface of, for example, a gearbox or of a traction motor. In the present embodiment, the apparatus 2 is designed to capture displacements in the range of +/−10 mm and rotations in the range of +/−10°.

In the present embodiment, the apparatus 2 comprises a profilometer 4 which is designed for contactless, for example optical or laser, capture of a surface topography. A measurement body 6, which has a defined (known before scanning or determinable after scanning) spatial relationship to the object O, is sampled for this purpose with a sensor head 8 of the profilometer 4. As is well known in the precision measurement art, the sensor head 8 detects measurements along a scan-plane 9, which may be generated for example by a scanning laser. The measurement body 6 may be attached to the object O or may alternatively be formed on or with the object O.

In FIG. 1, a longitudinal axis or x-axis xs, a transverse axis or y-axis ys, and a vertical axis or z-axis zs defined relative to the profilometer scan-plane 9 are illustrated, along with a longitudinal axis or x-axis xt, a transverse axis or y-axis yt and a vertical axis or z-axis zt of the object O.

The measurement body 6 will now first be explained in detail with additional reference to FIGS. 2 to 5.

In the present embodiment, the measurement body 6 is shown to have four measurement points P1, P2, P3, P4 defined thereon.

In the present embodiment, the measurement body 6 has a wedge-shaped basic form. The measurement body 6 comprises six planar surfaces 10a, 10b, 10c, 10d, 10e, 10f. Five surfaces 10*a*, 10*b*, 10*c*, 10*d*, 10*e* each have a trapezoidal basic form, while one surface 10*f* has a rectangular basic form.

In the following detailed description of the five trapezoidal surfaces 10*a*, 10*b*, 10*c*, 10*d*, 10*e*, the respective two parallel edges are referred to as the base edges of the respective trapezoid. The longer of the two respective base edges is referred to as the base of the respective trapezoid, while the two adjacent (generally non-parallel) edges are referred to as legs.

Figure 2:
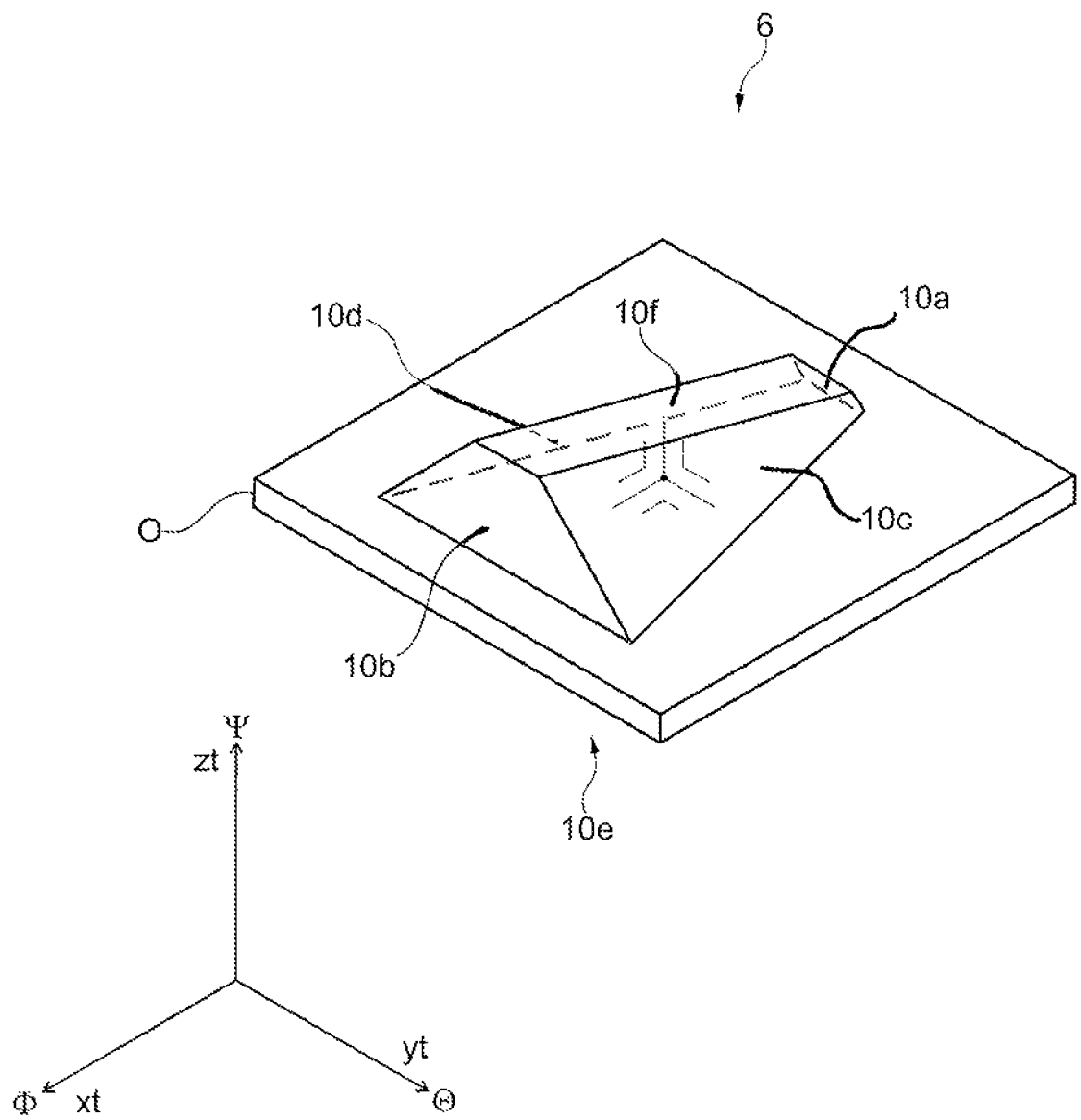
FIG. 2 shows a perspective illustration of the measurement body shown in FIG. 1 according to a first embodiment.
Figure 3:
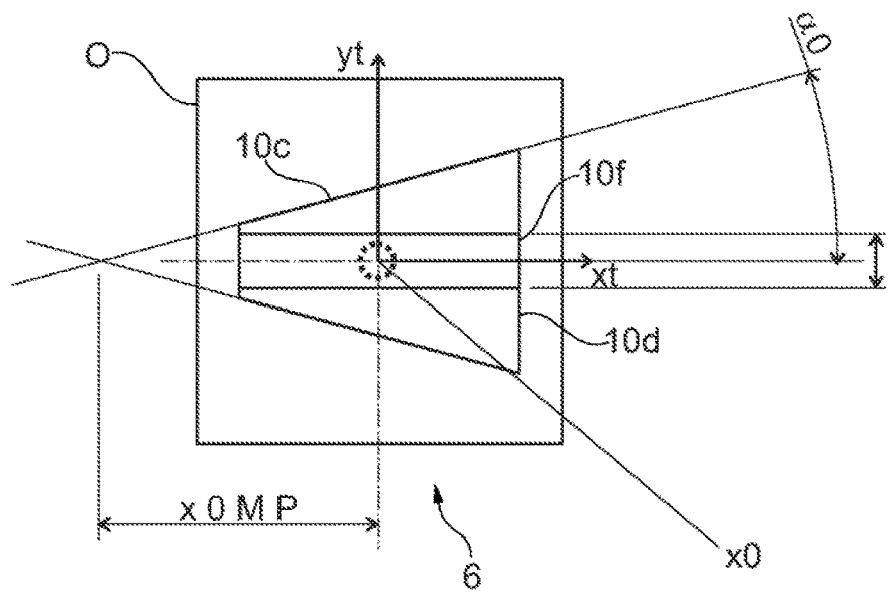
FIG. 3 shows a plan view of the measurement body shown in FIG. 2.
Figure 4:
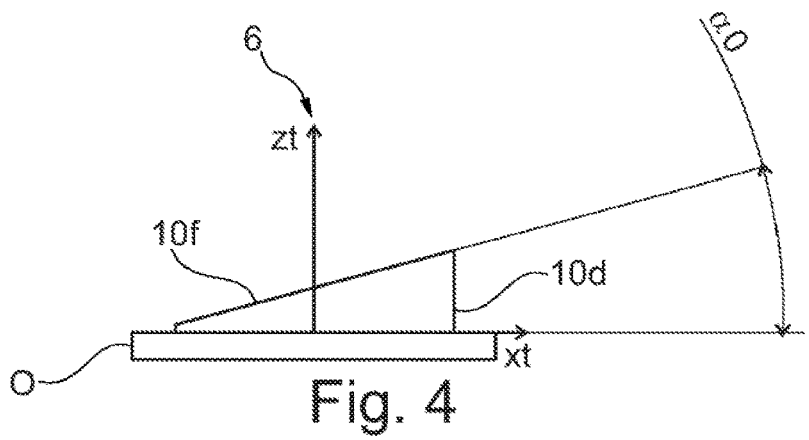
FIG. 4 shows a side view of the measurement body shown in FIG. 2.
Figure 5:
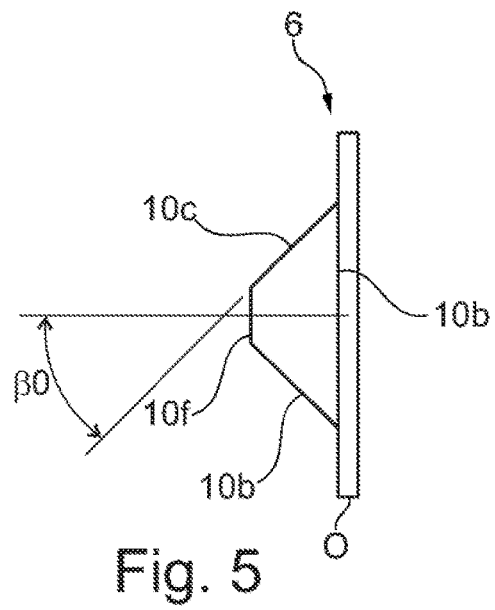
FIG. 5 shows a front view of the measurement body shown in FIG. 2.

The second 10*b* and the first surface 10*a* (located opposite the second surface 10*b*, on the far side of the measurement body 6, and therefore not visible in FIG. 2) are each formed as trapezoids with equal legs, i.e. symmetrical trapezoids, and are arranged parallel to one another. The respective normal vectors of the first surface 10*a* and the second surface 10*b* are coincident with the longitudinal axis or with the xt-axis.

The third surface 10*c* and the fourth surface 10*d* (located opposite the third surface 10*c*, and therefore not visible in FIG. 2) are asymmetrical trapezoids. The respective bases of the third surface 10*c* and of the fourth surface 10*d* are adjacent to the second surface 10*b*, while the respective shorter base edges are adjacent to the first surface 10*a*. In other words, the respective directions in which the respective third surface 10*c* and fourth surface 10*d* taper have the same orientation. A normal vector to the third surface 10*c* has an x-component, a y-component and a z-component, wherein the x-component deviates from the xt-axis by an angle of $\beta0=45°$ (in the same way as the z-component deviates by an angle of 45° from the zt-axis), while the y-component deviates from the yt-axis by an angle of $\alpha0=15°$. A normal vector to the fourth surface 10*d* also has an x-component, a y-component and a z-component, wherein the x-component deviates from the xt-axis by an angle of $\beta0=45°$ (in the same way as the z-component deviates by an angle of 45° from the zt-axis), while the y-component deviates from the yt-axis by an angle of $\alpha0=15°$. The third surface 10*c* and the fourth surface 10*d* however are not arranged in a manner aligned parallel to one another buts are arranged in intersecting planes.

The fifth surface 10*e* (adjacent or oriented toward the object O in the depicted embodiment, and therefore not visible in FIG. 2) is formed as an isosceles or symmetrical trapezoid. The base of the fifth surface 10*e* is adjacent to the base of the second surface 10*b*, while the shorter base edge of the fifth surface 10*e* is adjacent to the base of the first surface 10*a*. The respective legs of the fifth surface 10*e* are adjacent to the respective legs of the respective surfaces 10*c* and 10*d*. A normal vector to the fifth surface 10*e* is coincident with the vertical axis or with the zt-axis. The measurement body 6 is connected by way of the fifth surface 10*e* to the object O, while the object O, due to its planar, flat extent, forms an extension to the fifth surface 10*e*.

The sixth surface 10*f* is a rectangle with two transverse edges in the direction of the yt-axis or the transverse axis, and two longitudinal edges, perpendicular to these transverse edges. The respective transverse edges of the sixth surface 10*f* are adjacent to the respective, shorter base edges of the first surface 10*a* and the second surface 10*b*, while the respective longitudinal edges are adjacent to the respective legs of the respective surfaces 10*c* and 10d. A normal vector to the sixth surface 10*f* deviates by the angle $\alpha0=15°$ from the zt-axis or the vertical axis.

The measurement body 6 in the present embodiment is designed with axial symmetry, specifically with axial symmetry about the xt-axis or longitudinal axis inter alia by means of the selection on both edges of the angles as $\alpha0=15°$ and $\beta0=45°$.

In alternative to the present embodiment, the measurement body 2 can be designed without axial asymmetry. For example, a measurement body may comprise surfaces that are designed as non-isosceles triangles and/or as asymmetrical trapezoids. In other words, the angles $\alpha0$ and $\beta0$ illustrated in FIGS. 3 to 5 may exhibit different values on either edge of the respective extension axes. The angle $\alpha0$ in FIGS. 3 and 4 furthermore does not have to have the same value.

Figure 6:
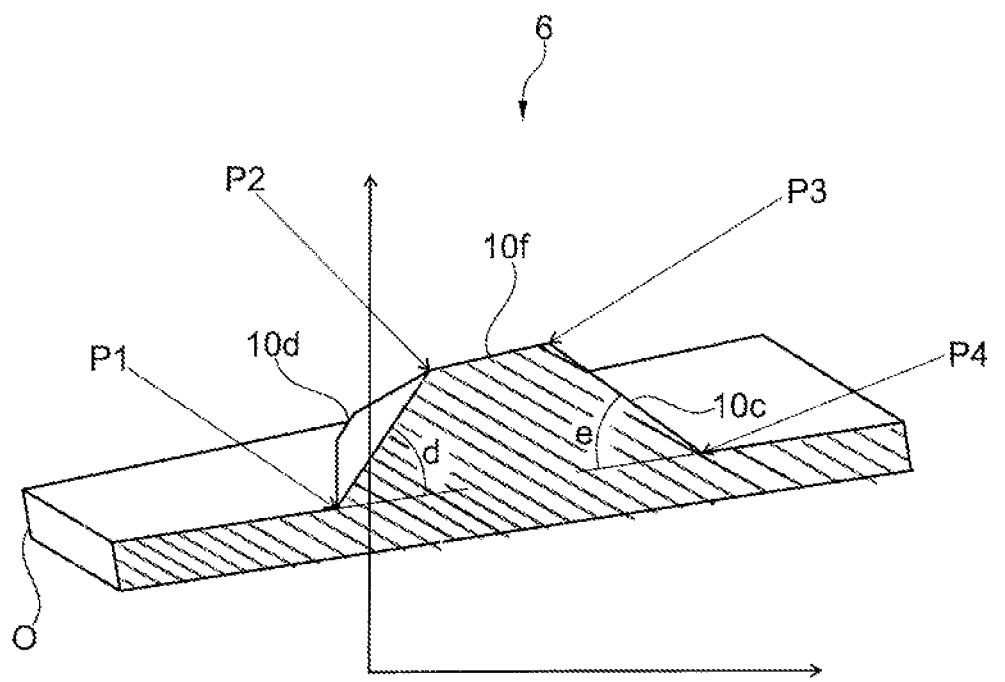
FIG. 6 shows a sectional view of the measurement body shown in FIG. 2 along a profile line.

Reference is now additionally made to FIG. 6.

A height profile along a profile line is illustrated, as is the result of sampling or scanning the object O with the measurement body 6 using the profilometer 4. The profilometer-detected profile line is the line along which the scan-plane 9 of the profilometer intersects or strikes the measurement body 6, and is characterized by four measurement points P1, P2, P3, P4. Each of the four measurement points P1, P2, P3, P4 is arranged at an intersection region between one starting surface and an immediately adjacent further surface 10*a*, 10*b*, 10*c*, 10*d*, 10*e*, 10*f*.

The two measurement points P1 and P4 define starting and ending points respectively of the profilometer-detected profile line, and the two other measurement points P2, P3 are arranged at respective intersections between the sixth surface 10*f* and the respective immediately adjacent third surface 10*c* and fourth surface 10*d*.

Since the measurement points P1, P2, P3, P4 lie in one plane (the plane defined by the scan-plane 9 of the profilometer 4), the measurement points P1, P2, P3, P4 can each be described by one set of bi-axial cartesian coordinates, namely in each case by a value in the direction of the zt-axis (or vertical axis) and a value in the direction of the yt-axis (or transverse axis).

Due to the shape of the measurement body 6, a linear or translational movement in the direction of the xt-axis leads to a change in the height, i.e. the z-coordinates or z-values, of the measurement points P2 and P3 as well as a change in the y-spacing of the measurement points P1 and P4. A movement in the direction of the yt-axis leads to an increase or reduction in the y-coordinates or y-values of all the measurement points P1, P2, P3, P4, while a movement in the direction of the zt-axis leads to an increase or reduction of the z-coordinates or z-values of all the measurement points P1, P2, P3, P4.

A rotary movement about the xt-axis leads to a rotation in the corresponding plane. A rotation about the yt-axis causes the angles $\delta$ and $\varepsilon$ to change in the same manner, i.e. each to increase or decrease together, although only as long as the rotary movement is less than the angle $\alpha0=15°$. A rotation about the zt-axis on the other hand causes the angles $\delta$ and $\varepsilon$ to change in opposite manners, i.e. the angle $\delta$ decreases and the angle $\varepsilon$ increases, or the angle $\delta$ increases and the angle $\varepsilon$ decreases, although only as long as the rotary movement is less than the angle $\alpha0=15°$.

All the necessary information is thus made available to determine a displacement of the object O in the direction of all three spatial axes xt, yt, zt as well as a rotation about all three axes of rotation $\Phi$, $\Theta$, $\Psi$.

Figure 7:
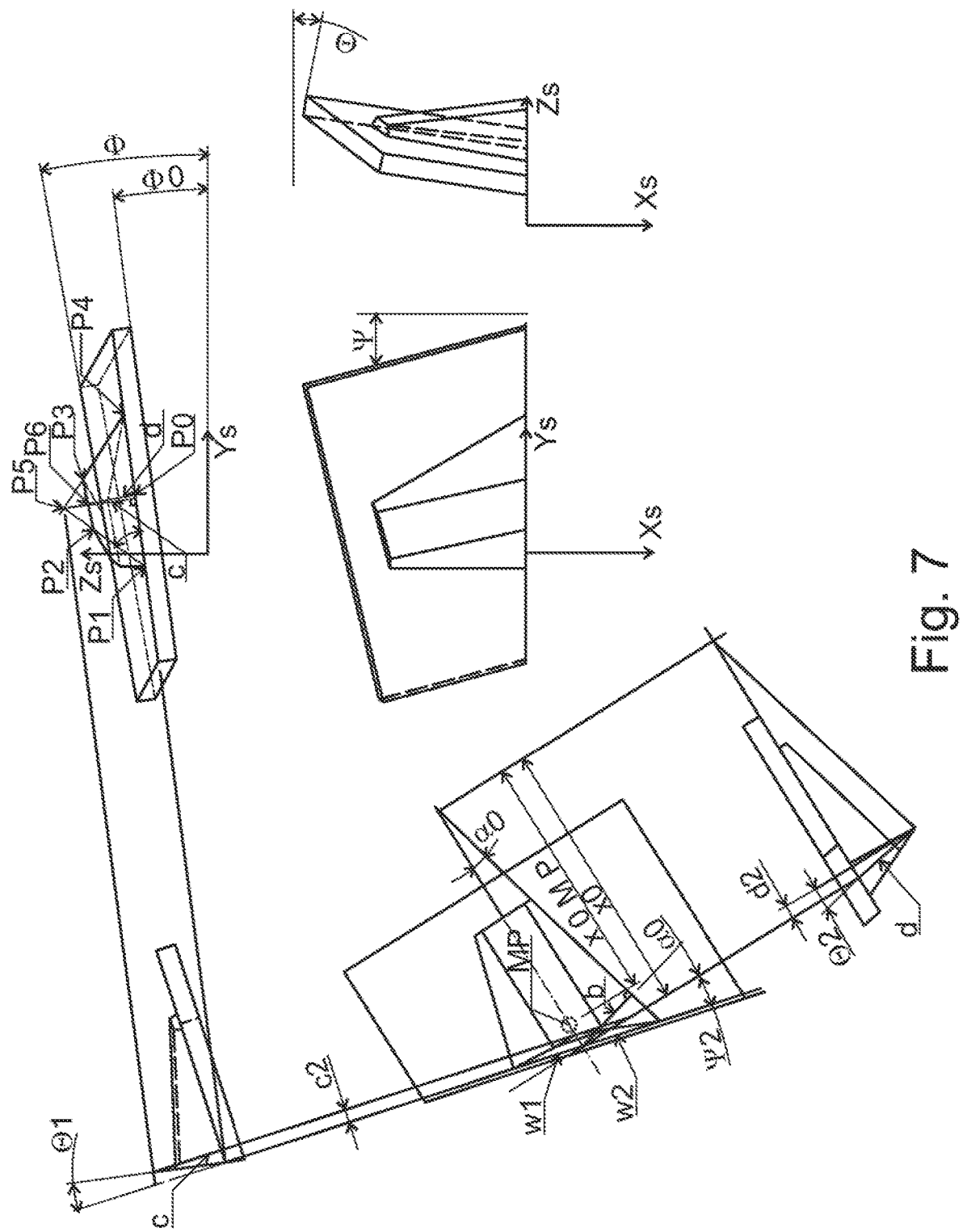
FIG. 7 shows an auxiliary perspective view to explain the method.

The evaluation of the measurement data will now be explained with additional reference to FIG. 7.

Sampling or scanning the measurement body 6 with the profilometer 4 delivers a data set representative of the height profile along the profile line. It comprises a plurality of value pairs or planar cartesian (rectilinear) coordinates, each of which comprises a y-value for the respective position along the width of the profile line and a z-value for the respective height at this position.

The data set is evaluated in order, on the basis of a change in the respective y-value or the gradient and/or change in gradient, to determine the value pairs that correspond to the measurement points P1, P2, P3, P4. The following measurement data coordinate set M results for the measurement points P1, P2, P3, P4:

$$P1(P1y|P1z), P2(P2y|P2z), P3(P3y|P3z), P4(P4y|P4z)$$

These coordinates relate, as do also the coordinate representations of points that will follow, to the coordinate system of the scan plane 9 generated by the sensor head 8.

A series of auxiliary variables is then determined.

A first auxiliary variable P5 is an intersection point between a first auxiliary straight line that runs through the measurement points P1 and P2 and a second auxiliary straight line that runs through the measurement points P3 and P4. The following applies for the y-value P5y:

$$P5y=((P4y-P3y)\cdot(P2y\cdot P1z-P1y\cdot P2z)-(P2y-P1y)\cdot(P4y\cdot P3z-P3y\cdot P4z))/((P4z-P3z)\cdot(P2y-P1y)-(P2z-P1z)\cdot(P4y-P3y))$$

The following applies for the z-value P5z:

$$P5z=((P1z-P2z)\cdot(P4y\cdot P3z-P3y\cdot P4z)-(P3z-P4z)\cdot(P2y\cdot P1z-P1y\cdot P2z))/((P4z-P3z)\cdot(P2y-P1y)-(P2z-P1z)\cdot(P4y-P3y))$$

A further auxiliary variable P6 is the center between measurement points P2 and P3, which center lies in the y0 plane of the measurement body 6. The following apply for the respective y-value and z-value:

$$P6y=P2y+0.5(P3y-P2y)$$

$$P6z=P2z+0.5(P3z-P2z)$$

A further auxiliary variable P0 is an intersection point between of a first auxiliary straight line that runs through the measurement points P1 and P4, and of a second auxiliary straight line that runs through the auxiliary variables P5 and P6. It is located both in the y0-plane of the measurement body 6 and in the z0-plane of the measurement body 6. The following applies for the y-value P0y:

$$P0y=((P6y-P5y)\cdot(P4y\cdot P1z-P1y\cdot P4z)-(P4y-P4z)\cdot(P6y\cdot P5z-P5y\cdot P6z))/((P6z-P5z)\cdot(P4y-P1y)-(P4z-P1z)\cdot(P6y-P5y))$$

The following applies for the z-value P0z:

$$P0z=((P1z-P4z)\cdot(P6y\cdot P5z-P5y\cdot P6z)-(P5z-P6z)\cdot(P4y\cdot P1z-P1y\cdot P4z))/((P6z-P5z)\cdot(P4y-P1y)-(P4z-P1z)\cdot(P6y-P5y))$$

The segment u (connecting the measurement point P4 and the auxiliary variable P5), v (connecting the measurement point P1 and the auxiliary variable P), w (connecting the measurement point P4 and the measurement point P1), $w_1$ (connecting the measurement point P1 and the auxiliary variable P0), and $w_2$ (connecting the measurement point P4 and the auxiliary variable P0) are moreover determined as further auxiliary variables using Pythagoras' theorem:

$$u=P4P5=\sqrt{(P5y-P4y)^2+(P5z-P4z)^2}$$

$$v=P1P5=\sqrt{(P5y-P1y)^2+(P5z-P1z)^2}$$

$$w=P4P1=\sqrt{(P1y-P4y)^2+(P1z-P4z)^2}$$

$$w_1=P1P0=\sqrt{(P0y-P1y)^2+(P0z-P1z)^2}$$

$$w_2=P4P0=\sqrt{(P0y-P4y)^2+(P0z-P4z)^2}$$

The following auxiliary variables, which are segments and angles, are also determined using trigonometrical functions or the cosine theorem or Pythagoras' theorem:

$$a = x0 \tan(\alpha 0)$$

$$b = x0 \sin(\alpha 0)$$

$$\delta = \cos^{-1}\left(\frac{v^2 + w^2 - u^2}{2vw}\right)$$

$$c = v\sin(\delta)$$

$$d = P5P0 = \sqrt{(P0y - P5y)^2 + (P0z - P5z)^2}$$

In a further step, a rotation $\Psi 2$ about the zt-axis is then determined. The following applies for segments $w_1$ and $w_2$:

$$w_1 = \frac{b}{\cos(\alpha 0 - \Psi 2)}$$

$$w_2 = \frac{b}{\cos(\alpha 0 + \Psi 2)}$$

We then have for the ratio $w_2/w_1$:

$$\frac{w_2}{w_1} = \frac{\cos(\Psi 2 - \alpha 0)}{\cos(\Psi 2 + \alpha 0)}$$

Solving for $\Psi 2$ yields:

$$\Psi 2 = \tan^{-1}\left(\frac{\frac{w_2}{w_1} - \cos(2\alpha 0)}{\sin(2\alpha 0)}\right) - \alpha 0$$

In a further step, a rotation $\Theta 2$ about the yt-axis is determined. The following applies for segments b and d:

$$d = \frac{b}{\cos(\alpha 0 - \Theta 2)}$$

Through rearranging, and substituting $b = w_1 \cos(\alpha 0 - \Psi 2)$, we obtain:

$$d \cos(\alpha 0 - \Theta 2) = w_1 \cos(\alpha 0 - \Psi 2)$$

Rearranging for $\Theta 2$ yields:

$$\Theta 2 = -\cos^{-1}\left(\frac{w_1 \cos(\alpha 0 - \Psi 2)}{d}\right) + \alpha 0$$

In a further step, a rotation $\Theta 1$ about the yt*-axis is determined, where the yt* axis is the y-axis of the target system (t) as it is positioned due to the first rotation. In other words, $\Theta 1$ describes the rotation around the y-axis of an imaginary interim position of the target-fixed system (t*, with the asterisk denoting "interim"). For the segment d, depending on the rotation $\Theta 2$, we have:

$$d2 = d \sin(\Theta 2)$$

For the segment c, depending on the rotation $\Theta 1$ and the rotation $\Psi 2$, we have:

$$c2 = c\sin(\Theta 1) = d2\cos(\Psi 2)$$

Rearranging and inserting finally yields:

$$\Theta 1 = \sin^{-1}\left(\frac{c2}{c}\right) = \sin^{-1}\left(\frac{d\sin(\Theta 2)\cos(\psi 2)}{v\sin(\delta)}\right)$$

Furthermore, in a further step, the rotation $\Phi 0$ about the xs-axis is determined. The first measurement point P1 and the last measurement point P4 are evaluated for this purpose. For the rotation $\Phi 0$ we have:

$$\Phi 0 = \tan^{-1}\left(\frac{P4z - P1z}{P4y - P1y}\right)$$

In a further step, finally, the spacing $\Delta x$ of the auxiliary point P0 from a measurement reference point MP is determined. The following apply:

$$x0 = \frac{d\cos(\Theta 2 - \alpha 0)}{\sin(\alpha 0)}$$

$$\Delta x = x0MP - x0$$

The angles $\Psi 2$, $\Theta 1$ and $\Phi 0$ that are determined describe the rotation of the measurement body 6 about a fixed origin, and can now be used for a coordinate transformation into a spatially fixed reference system. Each point of the measurement body 6 can be transferred into a reference coordinate system through three sequential rotations through the angles $-\Psi$, $-\Theta$ and $-\Phi$.

This can be done for a vector r''' from the auxiliary point P0 to the measurement reference point MP (having the length $\Delta x$ and by definition being located on the x-axis of the measurement body 6):

$$\vec{r'''} = \begin{pmatrix} x''' \\ y''' \\ z''' \end{pmatrix} = \begin{pmatrix} \Delta x \\ 0 \\ 0 \end{pmatrix}$$

$$\begin{pmatrix} x'' \\ y'' \\ z'' \end{pmatrix} = \begin{pmatrix} \cos(-\Psi 2) & \sin(-\Psi 2) & 0 \\ -\sin(-\Psi 2) & \cos(-\Psi 2) & 0 \\ 0 & 0 & 1 \end{pmatrix} \cdot \begin{pmatrix} x''' \\ y''' \\ z''' \end{pmatrix}$$

$$\begin{pmatrix} x' \\ y' \\ z' \end{pmatrix} = \begin{pmatrix} \cos(-\Theta 1) & 0 & -\sin(-\Theta 1) \\ 0 & 1 & 0 \\ \sin(-\Theta 1) & 0 & \cos(-\Theta 1) \end{pmatrix} \cdot \begin{pmatrix} x'' \\ y'' \\ z'' \end{pmatrix}$$

$$\begin{pmatrix} x \\ y \\ z \end{pmatrix} = \begin{pmatrix} 1 & 0 & 0 \\ 0 & \cos(-\Phi 0) & \sin(-\Phi 0) \\ 0 & -\sin(-\Phi 0) & \cos(-\Phi 0) \end{pmatrix} \cdot \begin{pmatrix} x' \\ y' \\ z' \end{pmatrix}$$

Here (x|y|z) is the vector r, which joins the auxiliary point P0 to the measurement reference point MP, represented in the coordinate system of the sensor head 8. The coordinates of the measurement point in the spatially fixed reference coordinate system describe the displacement of the measurement body 6. The following equations apply to said displacement:

$$x_{MP} = x$$

$$y_{MP} = P0y + y$$

$$z_{MP} = P0z + z$$

It should be noted that $P0x=0$, since this point lies in the sampling or scanning plane 9 of the profilometer.

The rotary movement of the measurement body 6 is described in the present embodiment through a combination of the three sequential rotations through the angles $\Psi$, $\Theta$ and $\Phi$. This is, however, only one possible way of describing the rotation of the measurement body 6.

To derive a clearer description, it is possible to represent the three axes (unit vectors) of the coordinate system of the measurement body 6 in the reference coordinate system, in that the same matrix operations as above are used. The projections of these vectors on the reference coordinate system planes are helpful for visualizing the rotation:

The following applies for the y-axis of the measurement body 6 in the coordinate system of the measurement body 6:

$$\vec{r_2}''' = (0|1|0)$$

Then, for the representation of r2''' in the reference coordinate system, we have:

$$\vec{r_2} = (x_2|y_2|z_2)$$

For the angle $\Phi$ between the vector r2''' projected into the yz-plane of the reference coordinate system and the y-axis of the reference coordinate system we then have:

$$\Phi = \tan^{-1}\left(\frac{z_2}{y_2}\right)$$

The following applies for the z-axis of the measurement body 6 in the coordinate system of the measurement body 6:

$$\vec{r_3}''' = (0|0|1)$$

Then, for the representation of r3''' in the reference coordinate system, we have:

$$\vec{r_3} = (x_3|y_3|z_3)$$

For the angle $\Theta$ between the vector r3''' projected into the zx-plane of the reference coordinate system and the z-axis of the reference coordinate system we then have:

$$\Theta = \tan^{-1}\left(\frac{x_3}{z_3}\right)$$

The following applies for the x-axis of the measurement body 6 in the coordinate system of the measurement body 6:

$$\vec{r_1}''' = (1|0|0)$$

Then, for the representation of r1''' in the reference coordinate system, we have:

$$\vec{r_1} = (x_1|y_1|z_1)$$

For the angle $\Psi$ between the vector r1''' projected into the xy-plane of the reference coordinate system and the x-axis of the reference coordinate system we then have:

$$\Psi = \tan^{-1}\left(\frac{y_1}{x_1}\right)$$

A displacement of the object O in the direction of all three spatial axes, along with a rotation about all three axes of rotation, can thus be displayed more clearly using the measurement body 6.

Figure 8:
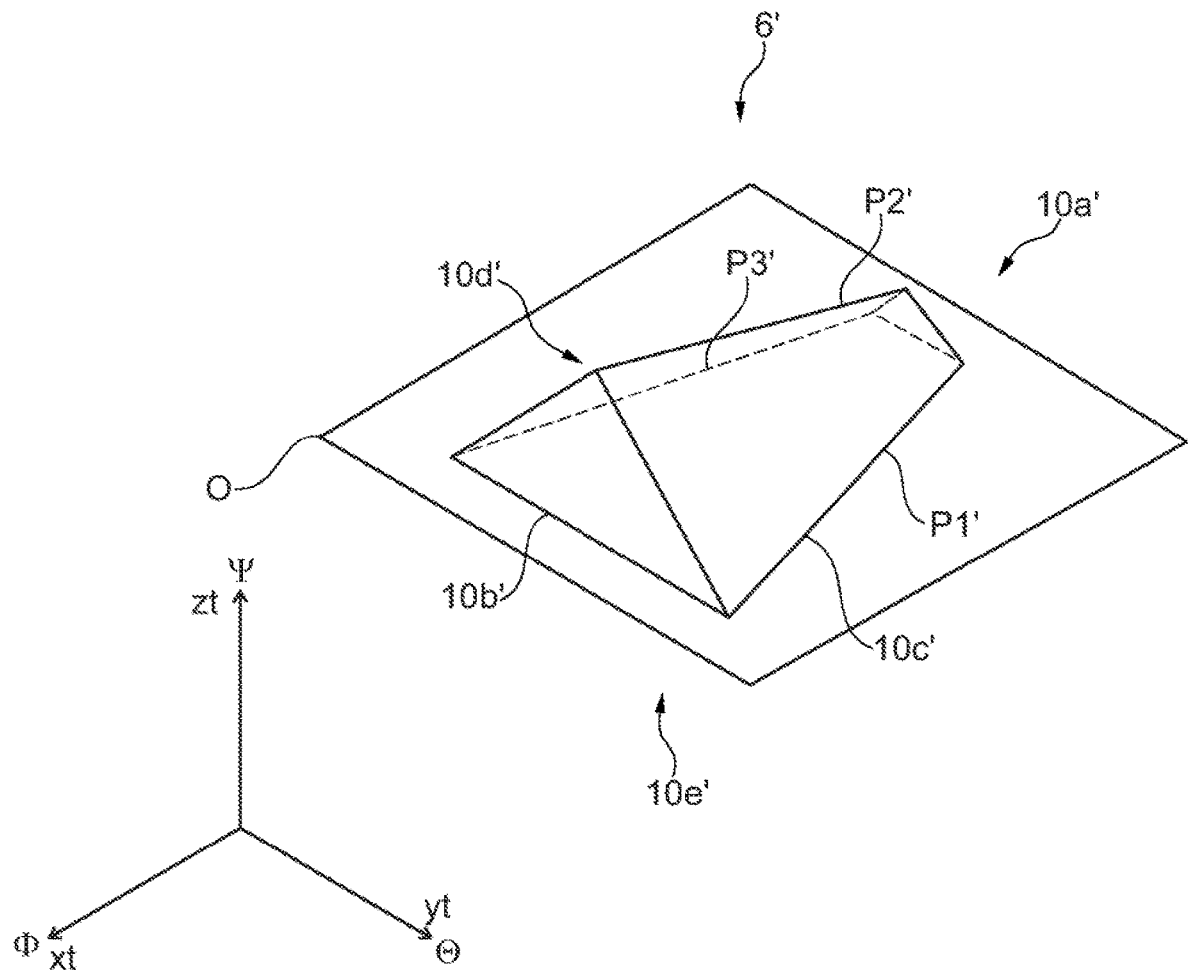
FIG. 8 shows a perspective illustration of a further measurement body according to a second embodiment.

The measurement body 6' according to a second embodiment will now first be explained in detail with additional reference to FIG. 8.

In the second embodiment, the measurement body 6' has three measurement points P1', P2', P3'.

The measurement body 6' according to the second embodiment also has a wedge-shaped basic form. The measurement body 6' according to the second embodiment however comprises five planar surfaces 10a', 10b+, 10c', 10d', 10e'. Two surfaces 10a', 10b' each have a triangular basic form, while three surfaces 10c', 10d', 10e' have a trapezoidal basic form.

The first surface 10a' and the second surface 10b' located opposite the first surface 10a' are each formed as isosceles triangles, and are arranged parallel to one another. A respective normal vector of the first surface 10a' and the second surface 10b' is coincident with the longitudinal axis or with the xt-axis.

The third surface 10c', the fourth surface 10d' and the fifth surface 10e' are each symmetrical trapezoids. The respective bases of the third surface 10c', the fourth surface 10d' and the fifth surface 10e' are adjacent to the second surface 10b', while the respective shorter base edges are adjacent to the first surface 10a'. In other words, the respective directions in which the respective third surface 10c', fourth surface 10d' and fifth surface 10e' taper have the same orientation.

The measurement body 6' is connected by way of the fifth surface 10e' to the object O, while the object O, due to its planar, flat extent, forms an extension to the fifth surface 10e'.

The measurement body 6' according to the second embodiment is designed in the present embodiment with axial symmetry.

In deviation from the present second embodiment, the measurement body 6' can also comprise surfaces that are designed as non-isosceles triangles and/or as asymmetrical trapezoids. Furthermore, the measurement body 6' according to the second embodiment can be designed with axial asymmetry.

In terms of the evaluation of the measurement data, when the measurement body 6' according to the second embodiment is used, only the three measurement points P1', P2', P3' are available. The measurement points P2 and P3 of the measurement body 6 according to the first embodiment are missing. If the two measurement bodies 6, 6' are compared, it further emerges that the measurement point P2' of the measurement body 6' according to the second embodiment corresponds to the auxiliary variable P5 in the evaluation of the measurement data when using the measurement body 6 according to the first embodiment.

The measurement data coordinate set M2, which is obtained using the measurement body 6' with the three measurement points P1', P2', P3' according to the second embodiment has, for example, the following format:

P1'(P1Y,P1z),P2'(P2y,P2z),P3'(P3Y,P3z)

The auxiliary variables P6 and P0 cannot be determined as above without the measurement points P2 and P3 of the measurement body 6 according to the first embodiment. The segments w1, w2 and d are, as a result, not available. The determination of the rotation Ψ2 about the zt-axis when the measurement body 6' according to the second embodiment is used can then be done by solving the following system of equations:

$$\frac{v\cos(\delta) + c\sin(\Theta 1)\tan(\Psi 2)}{u\cos(\varepsilon) + c\sin(\Theta 1)\tan(\Psi 2)} = \frac{\cos(\alpha 0 + \Psi 2)}{\cos(\alpha 0 - \Psi 2)}$$

$$\frac{w}{c} = \left(\frac{1}{\cos(\alpha 0 - \Psi 2)} + \frac{1}{\cos(\alpha 0 + \Psi 2)}\right)\frac{\cos(\alpha 0)}{\cos(\alpha 2)}\cos(\alpha 2 - \Theta 1)$$

$$\tan(\alpha 2) = \frac{\tan(\alpha 0)}{\cos(\Psi 2)}$$

$$\varepsilon = \cos^{-1}\left(\frac{u^2 + w^2 - v^2}{2uw}\right)$$

This system of equations can be solved analytically. This system of equations can, alternatively, be solved using a numerical determination of the roots in order to determine the rotation Ψ2. Alternatively, furthermore, a neural network can also be used after a training phase, or look-up tables can be used.

With knowledge of the rotation Ψ2 about the zt-axis, it is also possible to determine the segment lengths w1, w2 and d with the formulas shown further above. The calculation of the other variables sought can then be continued according to the method, using the measurement body 6 according to the first embodiment.

Reference is now made to FIG. 9.

At operation 12, using a profilometer, rectilinear coordinates for each of at least three measurement points on a profilometer-detected profile line of a measurement body having a defined spatial relationship to the object are captured. At operation 14, using the captured coordinates and known geometric values of the measurement body: 1) a z-axis rotation (Ψ2) of the measurement body about a measurement body z-axis (zt) is calculated, 2) a y-axis rotation (Θ1) of the measurement body about an intermediate y-axis (yt*) resulting from the z-axis rotation is calculated, and 3) an x-axis rotation (Φ0) of the measurement body about a profilometer-defined x-axis (xs) is calculated. At operation 16, using a) the rectilinear coordinates, b) the known geometric values of the measurement body, and c) the above-calculated rotations (Ψ2, Θ1, Φ0), a set of translation displacements of the measurement body relative to the profilometer-defined x-axis (xs), y-axis (ys), and z-axis (zs) is calculated. At operation 18, the defined spatial relationship of the measurement body is applied to the object to find a position and an orientation of the object.

What is claimed is:

1. A method of determining a position and an orientation of an object, comprising:
    capturing, using a profilometer, rectilinear coordinates for each of at least three measurement points on a profilometer-detected profile line of a measurement body having a defined spatial relationship to the object;
    calculating, using the captured coordinates and known geometric values of the measurement body:
    1) a z-axis rotation (Ψ2) of the measurement body about a measurement body z-axis (zt),
    2) a y-axis rotation (Θ1) of the measurement body about an intermediate y-axis (yt*) resulting from the z-axis rotation, and
    3) an x-axis rotation (Φ0) of the measurement body about a profilometer-defined x-axis (xs);

calculating, using a) the rectilinear coordinates, b) the known geometric values of the measurement body, and c) the above-calculated rotations ($\Psi 2$, $\Theta 1$, $\Phi 0$), a set of translation displacements of the measurement body relative to the profilometer-defined x-axis (xs), y-axis (ys), and z-axis (zs); and applying the defined spatial relationship of the measurement body to the object to find a position and an orientation of the object.

2. The method of claim 1, wherein the measurement body comprises six planar surfaces, five of the six surfaces having respective trapezoidal basic forms, and a remaining one of the six surfaces having a rectangular basic form, and wherein the profile line defines four measurement points, each of the measurement points being located at a respective intersection between a one of the surfaces and an immediately adjacent surface.

3. The method of claim 2, wherein two of the four measurement points are located at respective intersections between the surface having the rectangular basic form and a respective immediately adjacent surface having a trapezoidal basic form.

4. The method of claim 2, wherein the z-axis rotation ($\Psi 2$) is calculated by evaluating a first partial line and a second partial line of a line between a pair of the measurement points located farthest apart along the profile line, and a known angle of inclination of an intersection line of a first and a second of the surfaces having a trapezoidal basic form.

5. The method of claim 2, wherein the x-axis rotation ($\Phi 0$) is calculated by evaluating the coordinates of a pair of the measurement points located farthest apart along the profile line.

\* \* \* \* \*